US006976210B1

(12) United States Patent
Silva et al.

(10) Patent No.: US 6,976,210 B1
(45) Date of Patent: Dec. 13, 2005

(54) METHOD AND APPARATUS FOR WEB-SITE-INDEPENDENT PERSONALIZATION FROM MULTIPLE SITES HAVING USER-DETERMINED EXTRACTION FUNCTIONALITY

(75) Inventors: Juliana Freire Silva, Murray Hill, NJ (US); Vinod Anupam, Bridgewater, NJ (US); Yuri J. Breitbart, Madison, NJ (US); Bharat Kumar, Belle Mead, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 962 days.

(21) Appl. No.: 09/650,512

(22) Filed: Aug. 29, 2000

Related U.S. Application Data

(60) Provisional application No. 60/151,542, filed on Aug. 31, 1999.

(51) Int. Cl.[7] .............................................. G06F 15/16
(52) U.S. Cl. ..................... 715/513; 709/207; 709/217; 715/501.1; 715/511
(58) Field of Search ....................... 709/217; 707/501; 715/507, 513, 501.1, 511

(56) References Cited

U.S. PATENT DOCUMENTS

| 5,809,250 A * | 9/1998 | Kisor ......................... 709/227 |
| 5,905,866 A * | 5/1999 | Nakabayashi et al. ...... 709/223 |
| 6,122,647 A * | 9/2000 | Horowitz et al. ........... 715/513 |
| 6,199,079 B1 * | 3/2001 | Gupta et al. ................ 715/507 |
| 6,230,168 B1 * | 5/2001 | Unger et al. ............. 715/501.1 |
| 6,237,030 B1 * | 5/2001 | Adams et al. .............. 709/218 |
| 6,442,589 B1 * | 8/2002 | Takahashi et al. .......... 709/203 |

OTHER PUBLICATIONS

M. Bauer and D. Dengler: InfoBeans—Configuration of Personalized Information Services, IUI99, pp. 153-156.*
www.w3.org/19999/070WD-xpath-19990709, XML Path Language (Xpath) Version 1.0, W3C Recommendation, Jul. 9, 1999.*
H. Davulcu et a., "A Layered Architecture for Querying Dynamic Web Content," Proc. of SIGMOD, p. 491-502 (1999).*
V. Anupam et al., "Personalizing the Web Using Site Descriptions, " Proc. of DEXA Workshop, p. 732-738 (1999).*
www.w3.org/TR/1998/REC-xml-19980210-errata, "Extensible Markup Language (XML) 1.0" W3C Recommendation, Feb. 10, 1998.*

(Continued)

Primary Examiner—Paul H. Kang
(74) Attorney, Agent, or Firm—Stephen M. Gurey

(57) ABSTRACT

A personal Web view is created that includes a plurality of Web clippings. Each Web clipping contains information from a user-selected Web page, which can be essentially any Web page that is accessible on any Web server. In creating the page, the user loads a personalization applet into his browser and retrieves each Web page of interest. The applet then generates an access script for automatically accessing that Web page and the user specifies the attributes of the Web clipping derived from that Web page. A specification of the Web view is then stored in a file. When the Web view specification is later replayed, the Web page for each Web clipping is retrieved and the specified information is extracted. The plural Web clippings are then displayed in a browser in accordance with the specified layout.

54 Claims, 10 Drawing Sheets

OTHER PUBLICATIONS

H. Mizutani, "New Error Correcting Method for BCH Code using Neural Networks," Circuits and Systems, 1998. IEEE APCCAS, Nov. 24-27, 1998, pp.: 479-482.*

V. Anupam et al., "Automating Web Navigation with the WebVCR," *Proc. of WWW*, p. 503-517 (2000).

H. Davulcu et al., "A Layered Architecture for Querying Dynamic Web Content," *Proc. of SIGMOD*, p. 491-502 (1999).

V. Anupam et al., "Personalizing the Web Using Site Descriptions," *Proc. of DEXA Workshop*, p. 732-738 (1999).

U.S. Appl. No. 09/387,571, filed Aug. 31, 1999, Anupam et al.

U.S. Appl. No. 09/263,679, filed May 5, 1999, Davulcu et al.

U.S. Appl. No. 09/263,680, filed May 5, 1999, Davulcu et al.

* cited by examiner

METHOD AND APPARATUS FOR WEB-SITE-INDEPENDENT PERSONALIZATION FROM MULTIPLE SITES HAVING USER-DETERMINED EXTRACTION FUNCTIONALITY

CROSS-REFERENCE

This application claims the benefit of U.S. Provisional Application No. 60/151,542, filed Aug. 31, 1999.

This application also describes and claims subject matter that is described in co-pending United States patent application filed simultaneously herewith and entitled: "METHOD AND APPARATUS FOR WEB-SITE-INDEPENDENT PERSONALIZATION FROM MULTIPLE SITES HAVING USER-DETERMINED INDIVIDUAL REFRESH RATES", Ser. No. 09/650,144.

TECHNICAL FIELD

This invention relates to retrieving information from one or more Web servers connected on a data network such as the Internet, and more specifically, to personalizing such information regardless from which Web-site it is retrieved.

BACKGROUND OF THE INVENTION

There is a plethora of data available to users on the Internet today. With so much information, the user is faced with an information overload. A need exists for efficient filtering mechanisms that give better and faster access to data. Some sites (e.g., CNN and Quicken) address this problem by allowing a user to create personalized pages that contain only information that is of interest to the user. Other sites send notifications when the underlying data changes and some condition is met. Some problems with these approaches to personalization include: 1) personalization is limited to the information accessible from a single site; 2) personalization features are not offered by all Web sites that might be of interest to a user; and 3) since sites that provide personalization require users to sign up, privacy issues may be involved because the user needs to divulge personal information when signing up thereby potentially enabling the sites to track the interests of the user.

SUMMARY OF THE INVENTION

In accordance with the present invention, a user creates, from his own client computer through his browser operating in conjunction with a personalization applet or application, a personalized Web view comprising a set of Web clippings that contain information content from a plurality of user-selected source Web pages wherein the elements of information content of interest are extracted from each source Web page by the user when creating the Web view.

Essentially any Web page can be selected by a user to be a Web clipping component of the personalized Web view. In creating the personalized view for later replay, the user accesses the source Web page of his interest, extracts those elements within the source page that he wants included within the clipping, defines a layout of such information content within the clipping, if necessary, and the layout of the clipping itself within the totality of the composite Web view.

An important characteristic of Web information is that it may change frequently. For example, news sites may be updated hourly, financial sites may update stock prices every 20 minutes, weather updates are provided every three hours, online classified ads change daily, etc. Thus, in creating each Web clipping component of the composite personal Web view, the user can specify an independent refresh rate for that clipping. If the user, in creating that Web clipping does not specify a refresh rate, then a default refresh rate is set when the Web view is active. Further, in creating each clipping the user can specify a notification mechanism for alerting him or whomever or whatever he designates when the occurrence of a specified event condition is detected upon a refresh of that Web clipping. Thus, for example, if a clipping on the personalized page contains specified current stock prices from a selected Web site, the user can incorporate as part of the personalized page a notification mechanism that alerts him by email, by an automatically generated phone call, by page, or by other methods, when, for example, there has been any change at all in the extracted stock information or, employing a finer level of comparison, if one or more of the specified stocks has changed in value by some absolute or percentage basis since either the last refresh instance or since some plurality of past refresh instances. The creation of a personal Web view consisting of multiple Web clippings in which each clipping has an individual refresh rate and notification mechanism is the subject of the above noted co-pending patent application entitled "Method and Apparatus for Web-Site-Independent Personalization From Multiple Sites Having User-Determined Individual Refresh Rates", Ser. No. 09/650,144, filed simultaneously herewith.

When all the Web clippings that together form the composite Web view are created, the specification of the Web view is stored in a file for later access and replay. Upon retrieval of the Web view, each Web clipping specification is processed by the personalization applet or program by retrieving the source Web page, extracting the information content as defined by the clipping specification, creating a frame (or a layer) according to the layout specifications, inserting code into the frame to ensure that the frame is refreshed at the specified time interval and, if a notification is defined, executing such notification upon the occurrence of the specified event condition, and displaying the Web clippings in the composite Web view in accordance with the defined layout.

Although the source Web page of a clipping may be accessible via direct access through the input of its URL address, some Web pages may not be directly accessible and require multiple browsing steps to retrieve them. If the information of interest that the user wants to include within his personalized Web view is on such a page that is not retrievable via a direct input of a URL a methodology for automatically accessing such a page is employed. Whereas any Web language could be used to automate this process, a user would be required to write a customized program to access each such page. In order to build a system that is targeted to the casual user who is not a programmer, other methodologies are used for automatically creating such access programs as needed. Specifically, smart bookmarks and site descriptions are used to achieve the necessary functionality that enables direct access to the Web page containing the information that the user wants incorporated within his personal Web view when the Web page cannot be accessed through a direct step. Smart bookmarks are used to transparently record user navigation sequences, which are then stored as a script that can later be automatically replayed to retrieve the required data. Site descriptions, provide a simple and succinct way to represent the structure and contents of a Web site, and can be generated semiautomatically by example. Given a set of such descriptions, the user is able to simply select site descriptions and contents of interest without having to specify how they should be retrieved.

BRIEF DESCRIPTION OF THE DRAWING

FIG. 3 is an example of a personal Web view consisting of Web clippings from four different Web pages, which has been created in accordance with the present invention;

FIG. 4 shows a fragment of the source Web page for one of the Web clippings in FIG. 3;

DETAILED DESCRIPTION

Figure 1:
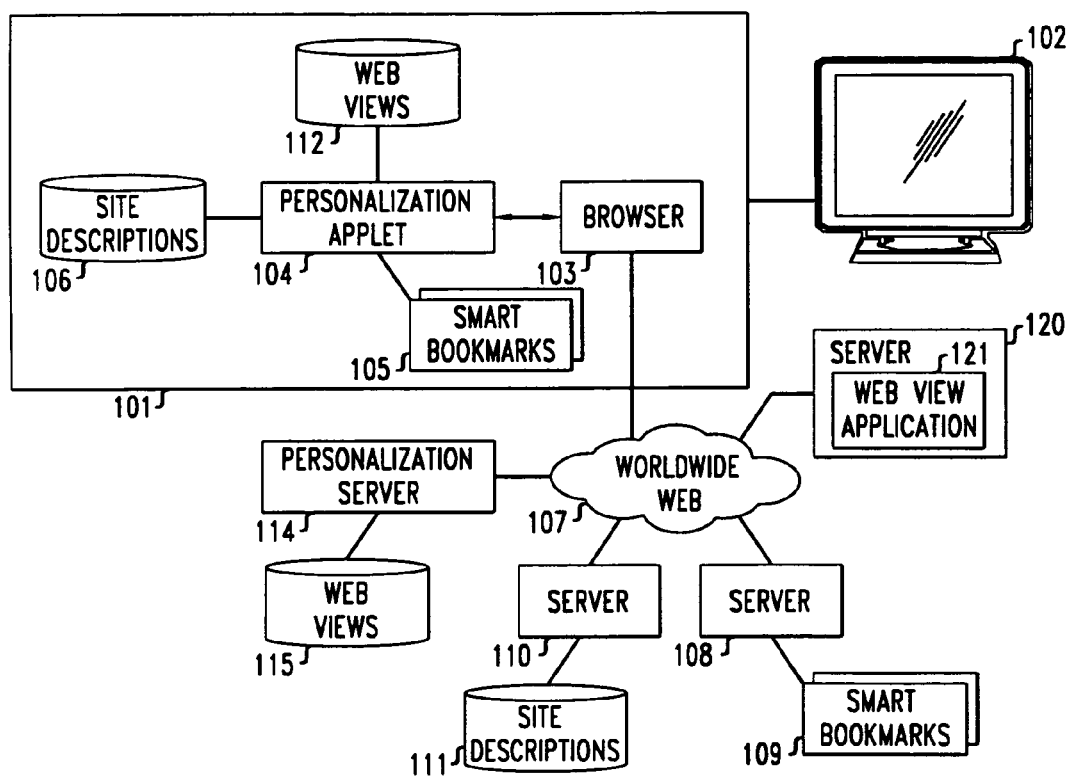
FIG. 1 shows the architecture of a system in accordance with the present invention that allows a user to create and access a personal view consisting of a set of Web clippings from a plurality of source Web pages.

With reference to FIG. 1, a user, through his client terminal 101 having a monitor 102, can create and then later replay a personalized Web view that contains Web clippings from one or more Web pages. In creating each Web clipping that constitutes a component of the Web view, the user can specify how frequently that Web clipping should be refreshed when the resultant Web view is active in the user's browser or on a server. Further, the user can specify if and how he should be notified upon the occurrence of some specified event condition in that Web clipping that occurs when then information content in that clipping changes upon its being updated. In creating the Web clipping from its source Web page, the user specifies exactly what information content that is resident on that Web page that is to be extracted and included and how that extracted information is to be displayed on the composite Web view being created.

The creation of the Web view is effected through the user's browser 103 in conjunction with a personalization applet (PA) 104 that is either stored on the user's machine or is available for downloading from an accessible server on the Internet or a local intranet. The PA 104 enables the user to customize access scripts that are generated from smart bookmarks or site descriptions (an extension of navigation maps). Smart bookmarks, and how they are created and replayed, are the subject of a co-pending patent application Ser. No. 09/387,571 entitled "Method For Creating And Playing Back A Smart Bookmark That Automatically Retrieves A Requested Web Page Through A Plurality Of Intermediate Web Pages", filed Aug. 31, 1999, now U.S. Pat. No. 6,535,912 issued Mar. 18, 2003, and in a paper entitled "Automating Web Navigation with the WebVCR", by V. Anupam, J. Freire, B. Kumar and D, Lieuwen, *Proc. of WWW*, pages, 503–517, 2000, which are incorporated herein by reference. Navigation maps are the subject of co-pending patent application Serial No. 09/263679 entitled "Method and Apparatus for Querying Dynamic Web Content", co-pending patent application Ser. No. 09/263,680 entitled "Method and Apparatus for Extracting Navigation Maps From Web Sites", both filed Mar. 5, 1999, and a paper entitled "A Layered Architecture for Querying Dynamic Web Content", by H. Davulcu, J. Freire, M. Kifer, and I. Ramakrishnan, *Proc. of SIGMOD*, pages 491–502, 1999, which are both incorporated herein by reference. Site descriptions extend navigation maps in two significant ways: they provide more flexibility in the selection as well as format of retrieved information; and they also provide a finer-grained specification of input and output parameters for retrieving information from specific nodes in the site description graph. Site descriptions are the subject of a paper entitled "Personalizing the Web Using Site Descriptions" by V. Anupam, Y. Breitbart, J. Freire, and B. Kumar, *Proceedings of DEXA Workshop* 1999, pages 732–738, and is incorporated herein by reference.

Each source Web page that contains information that is included in a composite Web view can be accessed either by directly accessing the URL of a Web page on which the desired information resides, or by selecting a node (or a set of nodes) in the site description where the desired information resides (alternatively, handles that represent such information and that encode the access path to the desired information can also be selected), or by a smart bookmark. Selected nodes, handles, or smart bookmarks encode a series of navigation steps that lead to the Web page with the desired information. Pre-established smart bookmarks and site descriptions that enable a user to directly access desired information that would otherwise require multiple navigation steps by the user can be accessed either locally on the client terminal 101 in smart bookmarks file 105 or site descriptions database 106, respectively. Alternatively, a pre-existing smart bookmark can be accessed through the World Wide Web (WWW) 107 from a server 108 through which the desired smart bookmark is stored as a smart bookmarks file 109. Similarly, a pre-existing site description can be accessed through the WWW 107 from a server 110 through which such site descriptions/navigation maps are stored in a site descriptions database 111. If a smart bookmark or a site description is not available to access information which cannot be directly accessed through the input of a URL and would otherwise require a series of navigation steps to retrieve, the user can create either a smart bookmark or a site description on demand as the Web clipping is being created. Creation of such smart bookmarks and site descriptions/navigation maps are described in the aforenoted U.S. Pat. No. 6,535,912 patent.

Once a Web view has been created by the user, it can be stored locally on the user's machine in a Web views application database 112 for later access by the user. In this mode, the creation and display of the Web view through the PA acts as the user's personal tool. All steps involved in the creation and display of the Web view occurs within the user's machine and are stored in that machine. Advantageously, the user is able to maintain complete privacy over his view and the information in that view. Alternatively, a Web view can be created through a personalization server 114 connected to WWW 107 and stored in a Web views database 115. Users from anywhere on the Web may then have access to the Web views stored in the Web views database 115 which are accessed through server 114.

The personalization applet 104, written to run on the user's machine 101 in conjunction with that machine's browser 103 can be written in the JAVA language or any other browser-supportable language. If running on server 114, the application performing the necessary functions can be written in any computer language.

Figure 2:
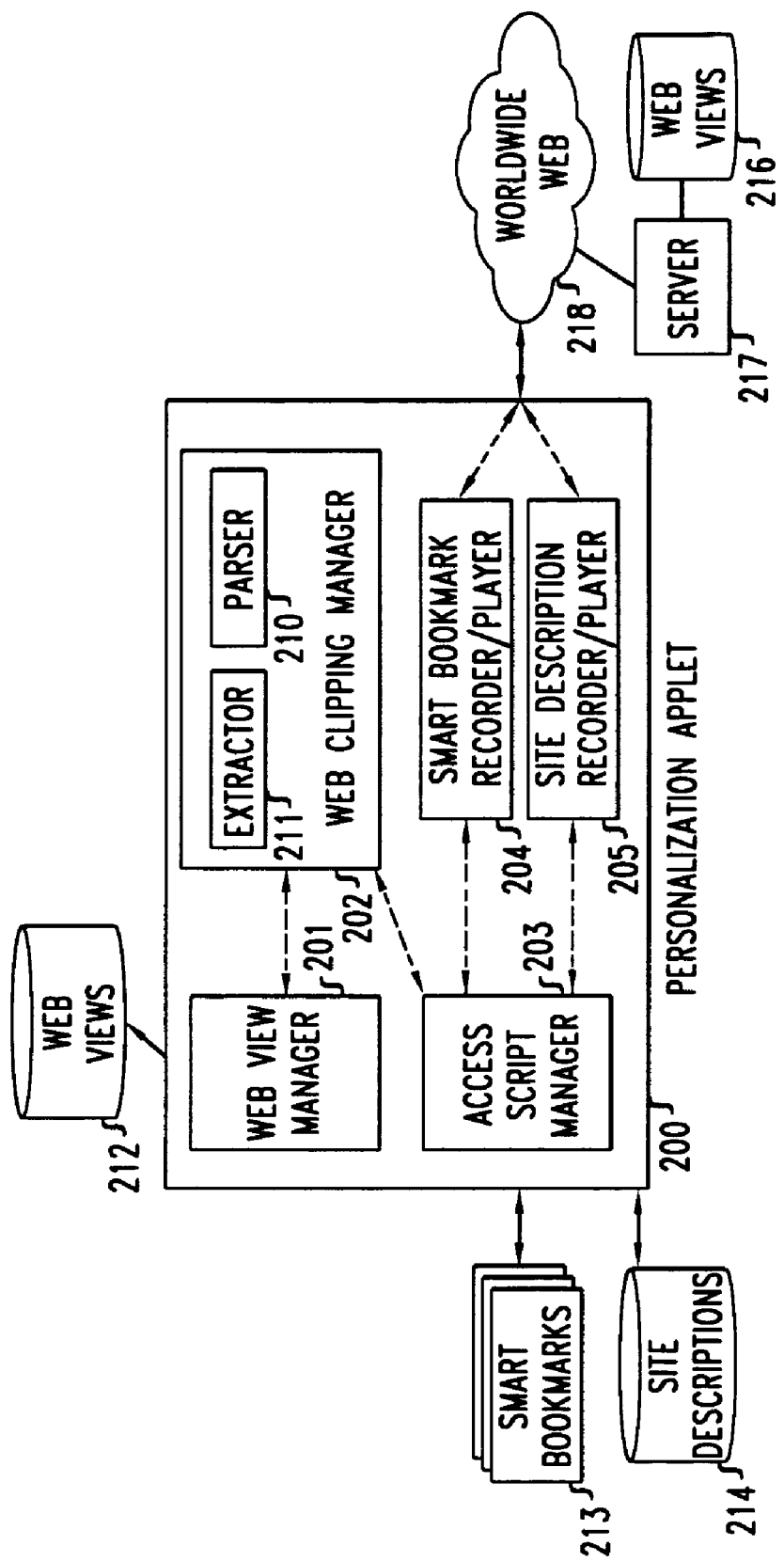
FIG. 2 shows the elements associated with the personalization applet or program involved in creating a Web view.

With reference to FIG. 2, the methodology and software components of the personalization applet 200 used to create a Web view are shown in block diagram format. As previously noted, a Web view is a set of Web clippings each of which is derived from a source Web page. The Web clippings that together comprise the Web view can be created by the user one-by-one. Alternatively, one or more previously created Web clipping can be incorporated within a Web view as it is being created. A user, by calling upon the personalization applet 200 through his browser, initiates the creation of a new Web view.

The Web view manager 201, within the personalization applet 200 functions to assemble various Web clippings together to form the view. It provides the user with the ability to specify how the resulting information content in the Web clipping will be physically arranged in the browser. The Web view manager 201 is also responsible for storing the Web view specification in Web views database 212 when the Web view has been completed.

The Web clipping manager 202 is responsible for the creation of the individual Web clippings that constitute the Web view through the selection of access scripts, and the customization and specification of the extraction of requested information content from the Web page that contains that information. In response to the user's request to create a Web clipping after initiating a request to create a new Web view, the Web clipping manager 202 signals the access script manager 203. The access script manager creates a script to 1) access a single URL if the clipping is reachable through the input of that URL; 2) read and customize an existing smart bookmark from smart bookmark file 213 to access the information to which that smart bookmark leads; or 3) read and customize an existing handle generated from a site description/navigation map from site descriptions database 214 to access the information to which that navigation map leads. If no such smart bookmark exists, a smart bookmark can be created through a smart bookmark recorder/player 204 and then saved in the smart bookmark file 213. Similarly, a site description/navigation map can be created by site description recorder/player 205 and then saved in the site descriptions database 214. Access script manager 203 then creates a script to access the desired information from the customized smart bookmark, the customized site description, or the direct URL, which is returned to the Web clipping manager 202 together with the retrieved Web page. That script consists of a sequence of executable steps that are going to retrieve the desired information. For a smart bookmark, those steps are a sequence of navigation steps. A site description is a tree where each node in the tree represents a Web page, and edges between nodes represent actions that are required to go from one page to the next. The tree encoded by a site description can be displayed on a GUI. The user may then select one or more nodes in that tree through the GUI, and given that selection, algorithms as described in the previously noted co-pending patent applications relating to navigation maps, are used to generate a script to access the selected page. Alternatively, handles that are pre-generated for particular nodes in the tree can be selected. If a single URL is specified for the Web clipping, the access script for that clipping consists of a single step to retrieve that Web page at that URL.

If the access script is derived from a site description or a smart bookmark, certain attributes may need to be specified by the user in order to retrieve the requested page. Information exported by site descriptions can be represented by handles. Handles include the description of the information that is retrieved by the handle (for example, a relation); a set of input attributes that include the mandatory attributes that a user must specify in order for the information to be successfully retrieved, and the optional attributes that can be further specified; output parameters that describe which fragments of the information retrieved should be returned to the user; and the navigation expression that encodes the navigation process to retrieve the desired information. Note that instead of selecting a particular handle, a user may select specific nodes in a site description, in which case the navigation map associated with the site description is scanned, and a handle with the required navigation expression is generated. The navigation expression in a handle can be automatically generated as described in the algorithms in the above noted patent application Ser. No. 09/253,679. In customizing a handle to access specific information of interest, the user must specify the obligatory attributes, any optional attributes, as well as the output attributes in which he is interest. The navigation expression in the handle can then be executed by either a transaction F-logic interpreter, or it can be translated into another language (e.g., Java or C), compiled and executed. If all attributes are specified, a completely bound navigation expression is created. Rather than creating a completely bound expression, the user can choose to be prompted to enter certain attributes when the Web view is replayed. Thus, each time the Web view is replayed, the user is able to specify such information.

A smart bookmark may also be parameterized, in which case the user must specify the required parameters. As with site descriptions, once the parameters are specified, a completely bound smart bookmark is generated (similar to a navigation expression) which can be replayed by a smart bookmark player, as described in the above-mentioned issued U.S. Pat. No. 6,535,912. As described above for site descriptions, the smart bookmark need not be bound to a fixed set of attribute values. When the Web view is replayed, the user can be prompted to enter a particular attribute value. As an example, if a smart bookmark is to a Web site which provides current stock ticker information, the stock symbols for the stock(s) of interest will need to be inputted by the user. These symbols can be saved in the Web clipping specification, in which case information about the same stocks will always be retrieved until the Web clipping is modified, or the user can be prompted to enter the stock symbols of current interest, in which case the clipping will not contain the information relating to those stocks, but will contain a specification for the user to input those symbols when the clipping is later replayed. Similarly, if the clipping is from a Web site that provides the current value of the user's own 401 (k) plan, the attributes that are likely going to need to be specified will include, for example, a login and a password. Such attributes can be specified when creating the Web clipping and saved as part of the clipping so that when the Web view is later replayed, the Web clipping with the user's personal information is automatically retrieved and made part of the view. Alternatively, rather than incorporating such user-personal information into the Web view, when the Web view is later replayed, the user can be prompted for those particular attributes before the information in that particular Web clipping is retrieved and displayed. This feature is useful not only for security reasons (e.g., a user may not want to save a password), but also for creating general clippings and views that can be shared by a group of users. Note that once a generic clipping is created, users can download and customize them. For example, if a generic clipping is created for the 401 (k) site, a user may customize it with his own personal information such as his login name and password.

Site descriptions provide a detailed model of a Web site that encodes the topology, capabilities, as well as a description of the information that the site exports. In particular, site descriptions may export a relational view of the information provided by a Web site. Thus, site descriptions allow a much finer customization than smart bookmarks in that sophisticated queries can be posed over the retrieved information. For example, the user is allowed to select output attributes that are a subset of the information that is retrievable, which corresponds to specifying projections in a relational database.

Once the user has on his browser the page that is retrieved through the selected access script, and appropriately encoded in some markup language, the user can select those elements on the page that he wants to extract and incorporate within the particular Web clipping being created as part of the overall personal Web view under construction. Various methodologies are available for extracting the desired information content. Such information content may be a table or part of a table on the page, or any identifiable object on the page. One such methodology is through a GUI that enables the user to select the specific information on the source Web page to be included within his personal Web view by pointing and clicking on the information. This can be done, for example, by parsing the displayed page through a parser 210 to generate the document object model (DOM) of the source Web page, which is displayed in a separate window. As the user selects an element in the DOM tree, the corresponding piece of the Web page can be highlighted in the browser to enable the user to identify his selections. Since DOM elements are uniquely identifiable in a Web page, the selected expression can simply use the DOM address to define which piece should be extracted by extractor 211. Given, however, that some Web pages are dynamic and may change often, additional parameters may be defined in order to make the extraction more robust to changes that might later occur. For example, the user may specify or the parser 210 may identify strings that surround or are within the desired element. The inclusion of additional information, such as identifying strings, advantageously improves the likelihood that the Web clipping, and thus the personal Web view will retrieve the desired information when it is later replayed. Note that since many HTML pages are not well-formed, there may be missing tags, tags for different elements may overlap, etc., the parser must correct such page anomalies. Thus parser 210 generates an equivalent well-formed version of the source Web page from which a clipping is to be extracted. Although currently most Web pages are HTML-formatted, Web pages are likely to be formatted in the XML format or another format in the future. For XML pages, in particular, since they can only be displayed if they are valid (and well-formed), such pre-processing of the source Web page is not necessary. It should be noted that present invention could be used with Web pages which are formatted with any type of markup language, whether presently known or created in the future. Other GUIs could also be used that automatically generate extraction expressions. An example could be a point-and-click interface that lets users select portions of Web pages (as he sees them in the Web browser), and provides him with different levels of abstraction that correspond to a breadth-first search in the portion of the document tree that is visible in the browser. For example, if a user is interested in particular cells of a table, he must first select the table and then, zoom into the table to select the desired cells.

Once the user has specified through the GUI the one or more elements on the source page that he wants incorporated into the Web clipping of his personal Web view, the corresponding extraction expressions are generated by the extractor 211. Rather than using the GUI described above to generate the extraction expressions, the user could specify these expressions using an XPATH expression (see, e.g., http://www.w3.org/TR/xpath for a description of the XPATH language). The user could thus write such expressions for inclusion within the Web clipping. Alternatively, a user interface similar to the GUIs described above, could also generate these XPATH expressions.

The inclusion of redundancy within the extraction expression is key to the robustness of the expression to insure that when the Web view is later replayed, the Web clipping will include the information originally intended by the user when the clipping was created, even if the underlying Web pages change between the time the clipping is created and the time it is replayed.

Once an extraction expression has been generated for the Web clipping being formed, the user can specify a refresh rate, which indicates how frequently the information contained within that clipping should be updated or retrieved from the Web when the personal Web view is replayed and active. If no refresh rate is specified, then a default value can be used. That default refresh rate may be whatever frequency appears in the Web page that contributes to the clipping. In addition, in creating the Web clipping, the user may also specify if, when, how, and to where notifications should be sent upon some specified event condition that can be detected upon a refresh of that clipping. Through a GUI the user can associate with the name of the clipping both a refresh rate and a notification mechanism to be implemented when the contents of the clipping change. The personal Web view builder provides a notification facility that tracks changes to the content of a Web clipping, wherein the notification is an event condition action pair (C, A) such that when a certain event occurs, action A is performed. In order to support this feature, every time a refresh of the Web clipping is performed and a new content of that clipping is retrieved, the system saves the previous clipping content. The event condition is then tested against the old and new versions of the Web clipping content. Such an event condition can be as simple as "if any change occurs to the content", which can be easily determined by comparing the present and the past instances of the Web clipping, or as complex as "if the stock price for Lucent Technologies goes up more than 30%," which requires the ability to identify specific pieces of information within the Web clipping. It is also possible to keep N versions of a Web clipping for some predetermined period of time to support temporal queries such as "if the stock price for Lucent Technologies went up more than 30% in the past week." If the event condition holds, then action A is executed. This action can take many forms. For example, it can be an email message, a phone call, or a page, directed to the user and/or to whomever the user designates, or a popup window on the user's terminal to alert the user about the change. Further, it can also trigger the refresh of another related Web clipping within the personal Web view, such as if the stock price for Lucent Technologies goes up more than 30%, refresh a Web clipping within the common Web view from a news site such as news.com/finance.

Once the Web clipping manager has created the extraction script and the refresh frequency has been specified together with an optional notification mechanism, the layout of the clipping may need to be specified if it contains more than one element from a source page. Further, the layout of the clipping with respect to entire Web view may be specified such as by specifying the size of the frame that the clipping should occupy, the X,Y coordinates of where the information within the clipping is to be placed and other options such as, for example, whether or not the clipping is scrollable. A default layout can also be specified in which case the system will place the Web clipping in the Web view according to how the system determines them to be best placed. The layout may also be specified by a point-and-click-and-drag interface, where users visually manipulate frames corresponding to Web clippings, to resize them, and place them at a desired position within the Web view window.

Web clipping manager 202, having completed the Web clipping, forwards the specification of this completed clipping to the Web view manager 201. All the information that has been inputted by the user that defines the individual Web clippings and the composite Web view is stored as a Web view in a Web views database 212 that is local to the user's machine. Alternatively, the Web view can be stored in a Web views database 216 associated with a trusted third party server 217 on the World Wide Web 218, which can be accessed by the user who created the Web view or any other user.

Figure 3:
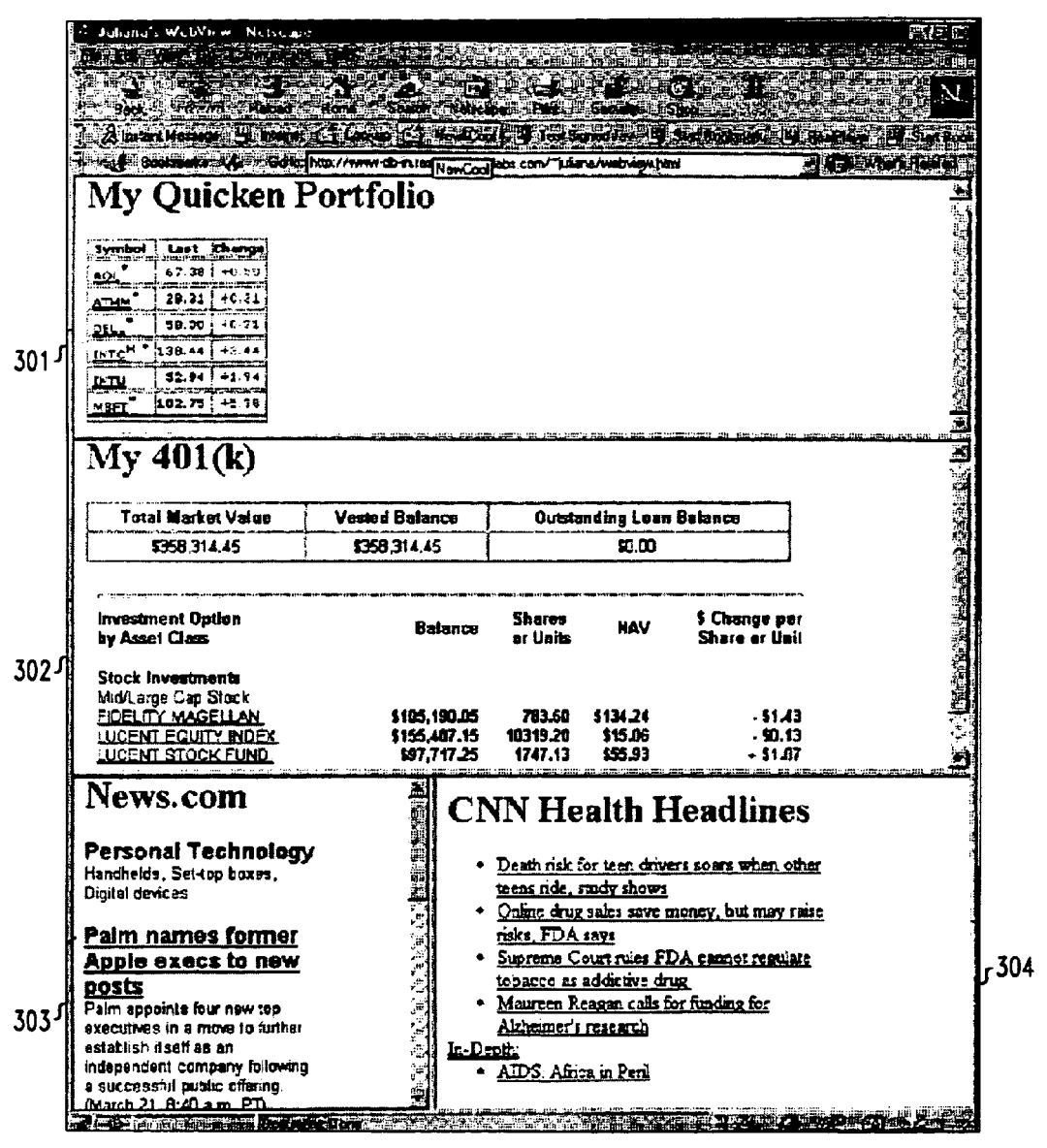

FIG. 3 is an example of a Web view as displayed on a browser that includes four Web clippings: Web clipping 301 is derived from the Quicken (www.quicken.com) Web site; Web clipping 302 is derived from Web site from which a user's personal 401(k) account can be retrieved; Web clipping 303 is derived from a CNET News Web site (news.cnet.com); and Web clipping 304 is derived from a CNN Web site (www.cnn.com). Table 1 shows the internal representation of the Web view in FIG. 3.

Table 1

```
<webView name="Juliana's WebView">
<clipping name="My Quicken Portfolio">
    <clippingScript> quicken_access_script </>
    <refreshRate minute=20> </>
    <notification condition="change" action="email
        juliana@lucent.com" </>
    <extract> //html/body/table[2] </>
    <layout height=100 width=100 x_axis=0 y_axis=0> </>
</clipping>
<clipping name="My 401(k)">
    <clippingScript> fidelity_access_script </>
    <notification condition="change" action="sms 9085550909"
        action="email juliana@lucent.com" </>
        <extract> //html/body/table[1] | //html/body/table[2] </>
        <refreshRate day=30> </>
        <layout> </>
</clipping>
<clipping name="News.com">
    <clippingScript> cnetnews_access_script </>
    <refreshRate hour=1> </>
    <extract> //html/body/table & contains("Personal Technology") </>
    <layout> </>
</clipping>
<clipping name="CNN Health Headlines">
    <clippingScript> cnnnews_access_script </>
    <refreshRate hour=1> </>
    <extract> //html/body/table & contains("Health Headlines") </>
    <layout> </>
</clipping>
</webView>
```

Figure 4:
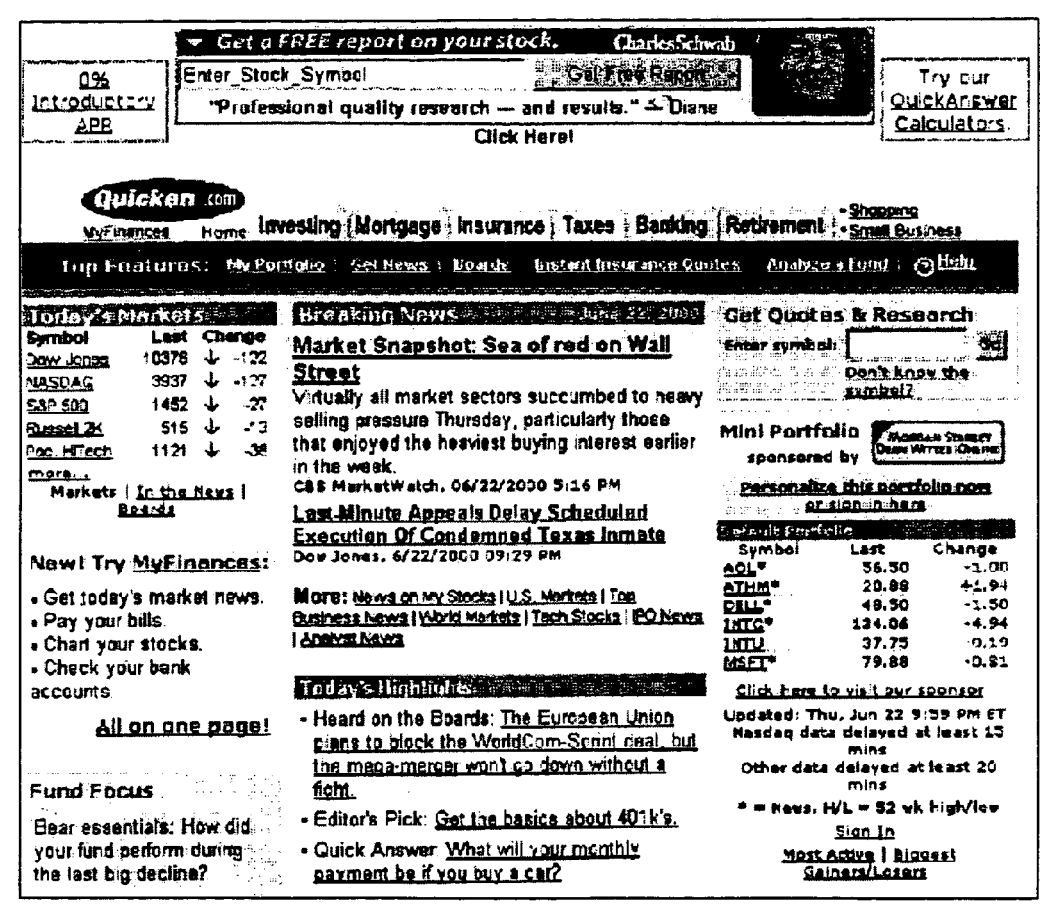

The Web clipping 301 from the quicken.com Web site is accessed, as noted in Table 1, with the quicken_access_script, which in this example accesses the source Web page, as shown in FIG. 4, with a direct URL. In particular, <clippingScript> contains a pointer to a script that has the required actions to retrieve the specific Web page, which in this case can be retrieved with a direct URL. Since the creator of the Web view is only interested in the Default Portfolio that is displayed on that Web page in a table, that table, the second table on the Web page, is extracted for the clipping with the <extract> function. Further, the refresh rate for this clipping is set at 20 minutes. Thus, when the Web view is active, the script will be executed every 20 minutes. The notification condition upon which an action will take place is defined as "change". Thus, if any change is detected in that table when a refresh is performed, then the specified action takes place. For this Web clipping that action is specified as the sending of an email message to juliana@lucent.com. Further, the layout of this clipping within the Web view is specified as being 100 pixels high and 100 pixels wide, located at the x/y 0/0 origin, which corresponds to the top left corner of the browser window.

The second Web clipping 302 in the Web view of FIG. 3, is a summary of the Web view creator's 401(k) plan which is retrievable through a Fidelity Web site by inputting a login name and a password and then clicking on a specific link. The <clippingScript> in this clipping contains a pointer to a script, fidelity_access_script, that has the required actions to go to the specified Web site, fill in the user's login and password, and click on the necessary link. That script uses a smart bookmark to reach the particular page at the Fidelity Web site that contains the information of interest. As previously described, that access script may have stored as part of the script the user's login and password. Alternatively, the user may customize the specific clipping within the Web view so that when the Web view is replayed, the user is prompted to input that information. In either case, the first and second tables on the destination page are extracted to form the clipping and the refresh rate is set at 30 days. Upon the detection of any change when a refresh is performed, two actions are specified: a short message (SMS) is sent to the specified cell phone number, 908,555 0909; and an email message is sent to the specified email address, juliana@lucent.com. The empty layout tag indicates that the default layout settings will be used for that clipping, letting the system determine the position of the clipping within the Web view.

Figure 5:
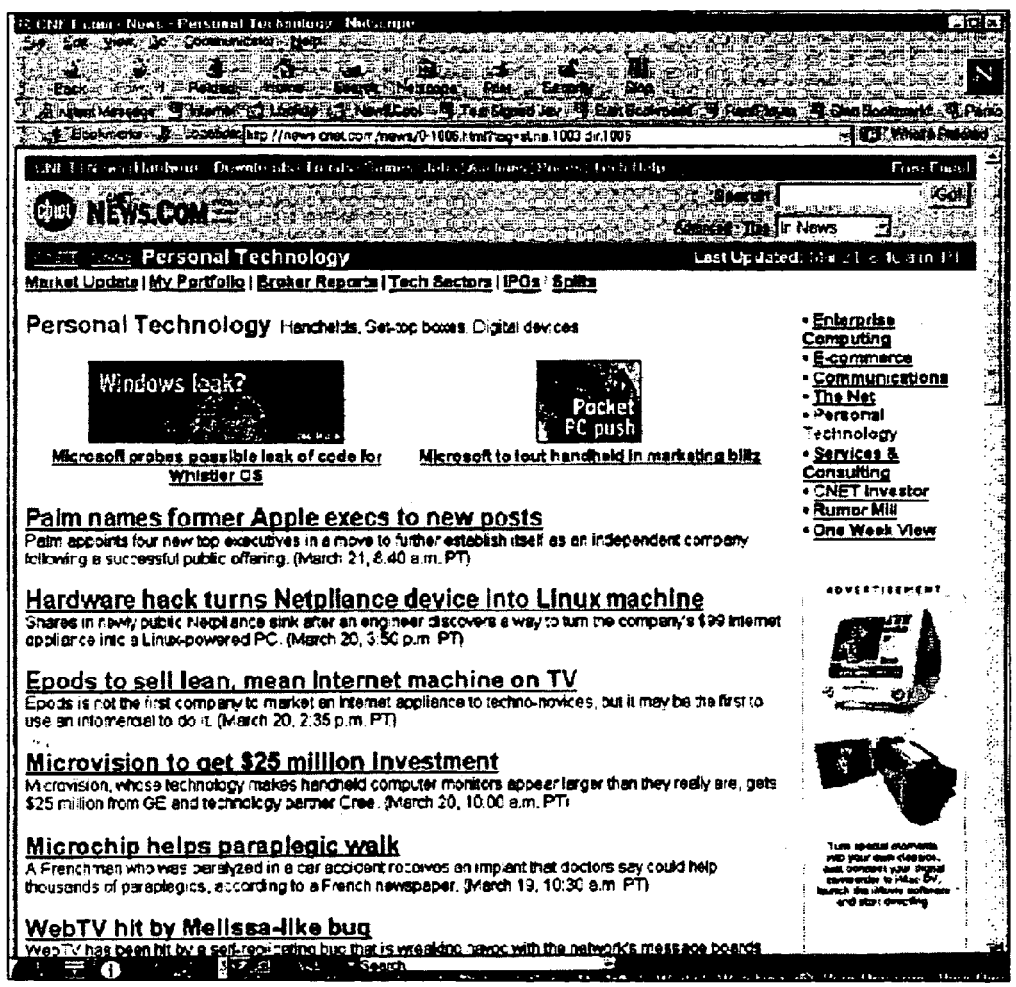
FIG. 5 shows a fragment of the source Web page for another one of the Web clippings in FIG. 3.

The third Web clipping 303 in the Web view in FIG. 3 contains the headlines in the Web page at the CNET News.com Web site pertaining to the personal technology section, as shown in FIG. 5. Since that Web page can be directly accessed, the access script cnetnews_access_script can retrieve that page with a direct URL. The <extract> calls for the table on the page containing the string "Personal Technology". The "Personal Technology" headline and each of the headline articles and associated summaries, which are incorporated as part of that table, are included within clipping 303. As can be noted in FIG. 3, clipping 303 is scrollable, as are clippings 301 and 302, to provide the user with visibility to the entire clipping. The refresh rate for this clipping is set at one hour. Thus the script is executed every hour. Since no <notification> tag is specified, no mechanism is employed to inform anyone upon any change in the clipping upon refresh.

The fourth web clipping 304 in the Web view in FIG. 3 contains health related headlines from the CNN Web site. Again, since the Web page containing the desired information can be directly reached at the CNN Web site, the access script cnnnews_access_script can access that page with a direct URL. The table containing "Health Headlines" is extracted as the clipping. The refresh rate is set at one hour, and no notification mechanism is specified.

A user who wants to replay a Web view that he or someone else has created that is either stored locally on the user's own machine in database 112 (in FIG. 1) or remotely on the Web in database 115 in association with a server 114 needs to execute a personalization Web view applet or Web view application. The personalization applet necessary to run the Web view may also be stored locally on the user's machine or can be downloaded on demand from anywhere. The applet lets the user select the Web view he wants displayed and performs the necessary processing for displaying the Web view in the user's browser. Alternatively, with reference again to FIG. 1, a server elsewhere (e.g., server 120) may have a Web view application 121 (in C program language or any other programming language) running on it. Given the Web view specification via a URL of where it is located, for example, the server on which the Web view application is running will execute that specification and return the final Web view to the requesting client. In this Web service model, therefore, the server on which the Web view application is resident can provide service to a plurality of different users who only need to specify the URL of the specification of the particular Web view they want to execute.

In the applet scenario, a Web view becomes active when a user loads it into a browser window, and is deactivated when the browser window is closed. Alternatively, users may explicitly control the activation and deactivation of Web views. In this case, the active Web views are replayed on the background and the resulting page is cached. If the user later tries to access this view, the system returns the cached page.

Figure 6:
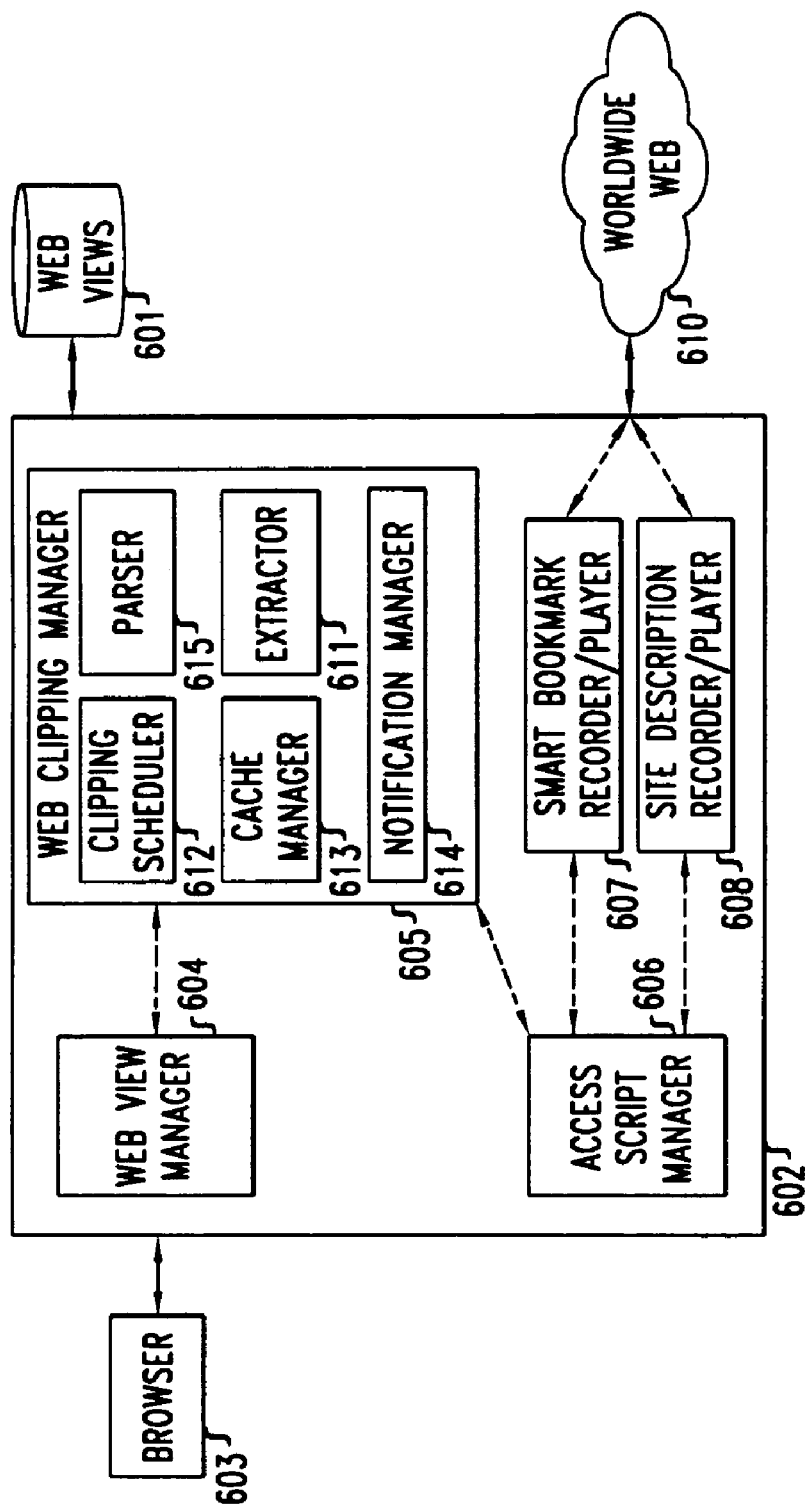
FIG. 6 shows the elements associated with the personalization applet or program involved in replaying a Web view.

With reference to FIG. 6, it is assumed for purposes of example that the Web view specification is stored locally in a Web views database 601 associated with the requesting user's machine and a personalization applet (PA) 602 is stored locally on that machine. The user, when wanting to execute and replay a Web view, selects the desired Web view through his browser 603, which starts PA 602. The Web view manager 604 then reads the selected Web view specification in database 601. A clipping specification within that Web view specification is selected and Web clipping manager 605 calls upon access script manager 606 to execute the access script to which the clipping points. Access script manager 606 then retrieves the Web page to which it is directed by the access script. This may involve executing a smart bookmark with specified inputs via smart bookmark recorder/player 607, which retrieves that page from over the World Wide Web 610; executing a navigation expression with specified inputs and outputs by site description recorder/player 608, which retrieves the page from the Web 610; or directly accessing a Web page at a URL specified in the access script. For the case of a smart bookmark or navigation expression, for bindings not incorporated within the access script, the user will be prompted to input whatever information is necessary to retrieve the Web page needed to create the Web clipping. Regardless of from where the Web page is retrieved, it is returned to Web clipping manager 605 where after cleaning up and parsing the page via the parser 615, the extractor 611 applies the Web clipping's extraction expression to it. If a clipping is not accessible, an error message is generated for that clipping. After extractor 611 applies the extraction expression to the retrieved Web page the clipping is returned to the Web view manager 604. The physical view of that clipping, which can be, for example, a frame or a layer as specified by the Web view creator, is then created in the browser in accordance with the layout as defined in the clipping.

Within Web clipping manager 605 clipping scheduler 612 acts upon the refresh rate to automatically replay the clipping at the specified intervals. Cache manager 613 stores the results of one or more previous clippings and notification manager 614 compares a just-received clipping with one or more previous clipping to determine whether a notification event condition has occurred. If the notification event condition has occurred, the action specified in the clipping is initiated.

Each clipping that is part of the Web view is processed in a similar manner either serially or in parallel with each other. The resultant Web view consisting of the plural Web clippings arranged in the specified layout is displayed by the browser 603.

It should be noted that if an application is running on a server performing the described functions of the personalization applet, then the application must save the Web view states for each user who is accessing that application, which include the various clipping contents at least the previous refresh times.

Figure 7A:
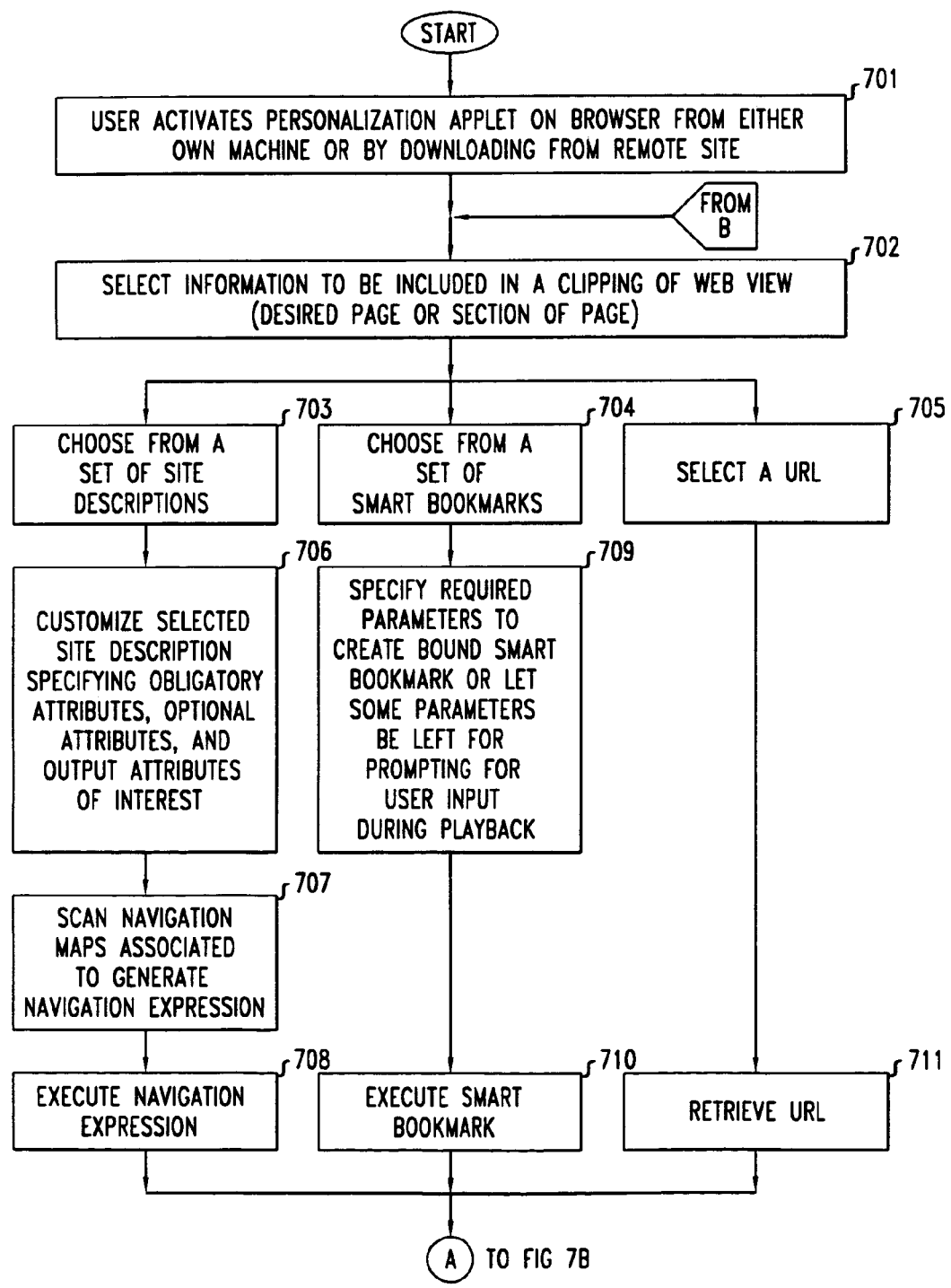
FIGS. 7A and 7B together show a flowchart detailing the steps for creating a personal Web view.
Figure 7B:
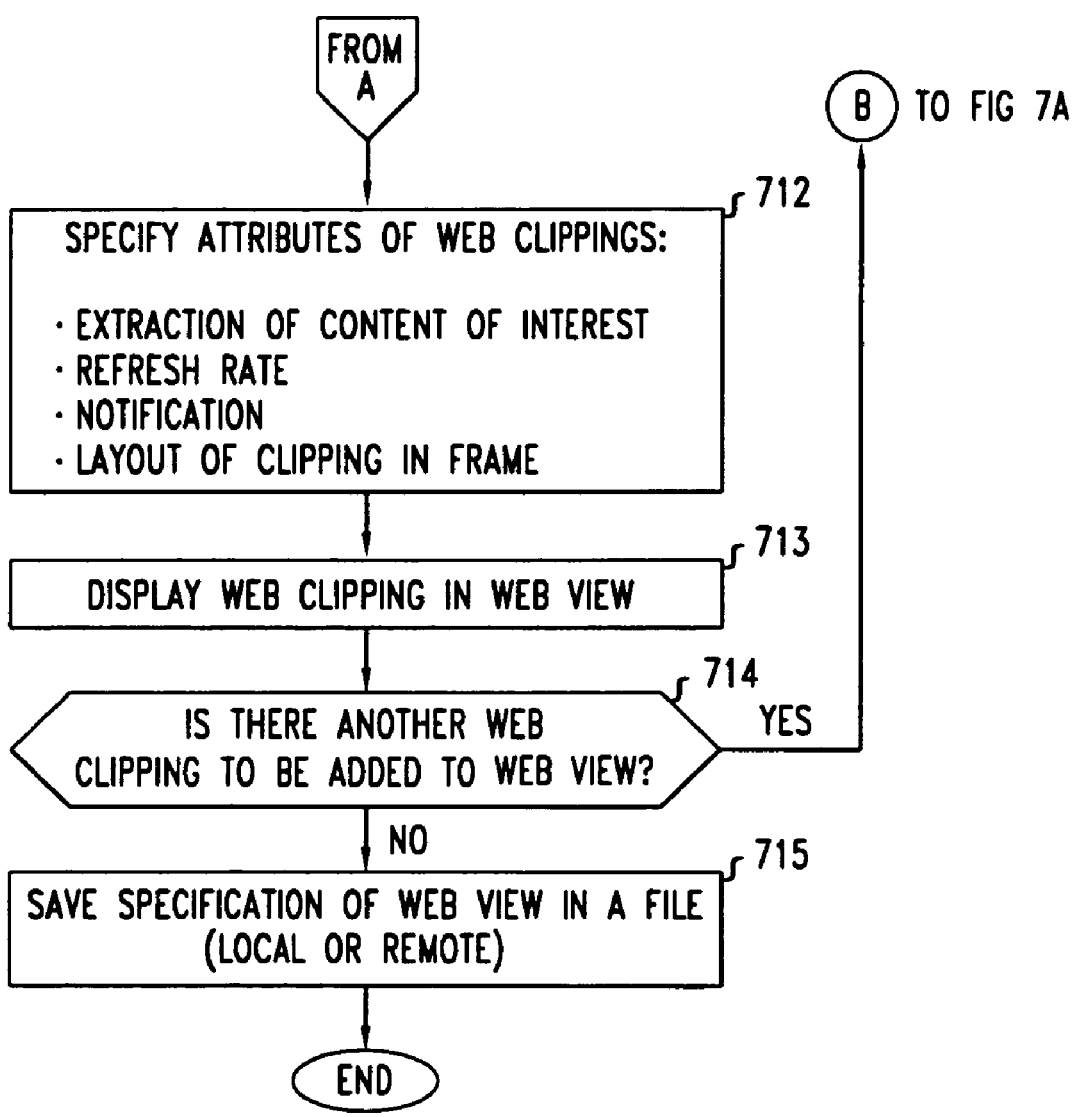

With reference to FIG. 7, the steps associated with creating a personal Web view are illustrated. At step 701 the user activates a personalization applet on his browser that is stored on his own machine or is downloaded from a remote site. At step 702, for a particular Web clipping that will constitute one clipping of a multi-clipping personal Web view, the user selects the information content to be included in the clipping (i.e., a desired Web page or a section of a Web page). This is done by one of the following: at step 703, if the desired information cannot be directly accessed by specifying a URL, choosing the particular site description that enables that information to be accessed from a set of pre-existing site descriptions; at step 704, if the desired information cannot be directly accessed by specifying a URL, choosing the particular smart bookmark that enables that information to be accessed from a set of pre-existing smart bookmarks; or at step 705, selecting the URL address at which the desired information can be directly accessed. Although not shown in the FIG. 7, if the information cannot be directly accessed by a URL and neither an existing site description nor an existing smart bookmark exists for accessing the desired information, then the user can create either a site description or a smart bookmark to access the information using prior art techniques for creating site descriptions and smart bookmarks, respectively. It will be assumed for purposes of the present discussion that the desired information can be accessed by either a pre-existing site description or smart bookmark, or directly via the specification of a URL address.

If the information is accessible via the selection at step 703 of a site description, then, at step 706, that selected site description is customized by specifying the obligatory attributes, the optional attributes, and the output attributes of interest. The user may choose that he be prompted for the input of certain attributes when the Web clipping is replayed. At step 707, the navigation map associated with bound site description is then scanned to generate a navigation expression. This navigation expression is then executed, at step 708, to retrieve the Web page containing the desired information.

If the information is accessible via the selection at step 704 of a smart bookmark, then, at step 709, the user specifies the required parameters to create a completely bound bookmark or chooses that the user be prompted to input certain parameters during playback of the Web view. At step 710, the smart bookmark is executed to retrieve the Web page containing the desired information.

If the information is accessible via the selection at step 705 of a URL, then, at step 711, the Web page at that URL is retrieved.

Following step 708, 710, or 711, at step 712, the attributes of the Web clipping are specified. These include the extraction from the retrieved Web page of the content of interest; the refresh rate to determine how often the information within the clipping should be retrieved; the notification mechanism to be employed upon an event condition/action pair; and the layout of where the clipping should be placed in the page and how big a frame it should occupy. At step 713, the Web clipping is displayed in the Web view. At step 714, a determination is made whether any other Web clippings to be added to the Web view. If there are, then the flow returns to step 702 and the described steps are repeated for the next Web clipping. After all the Web clippings that are to be included within the Web view have been processed, then, at step 715, the specification of the Web view is stored in a file either locally to the user's machine or at a remote site.

Figure 8:
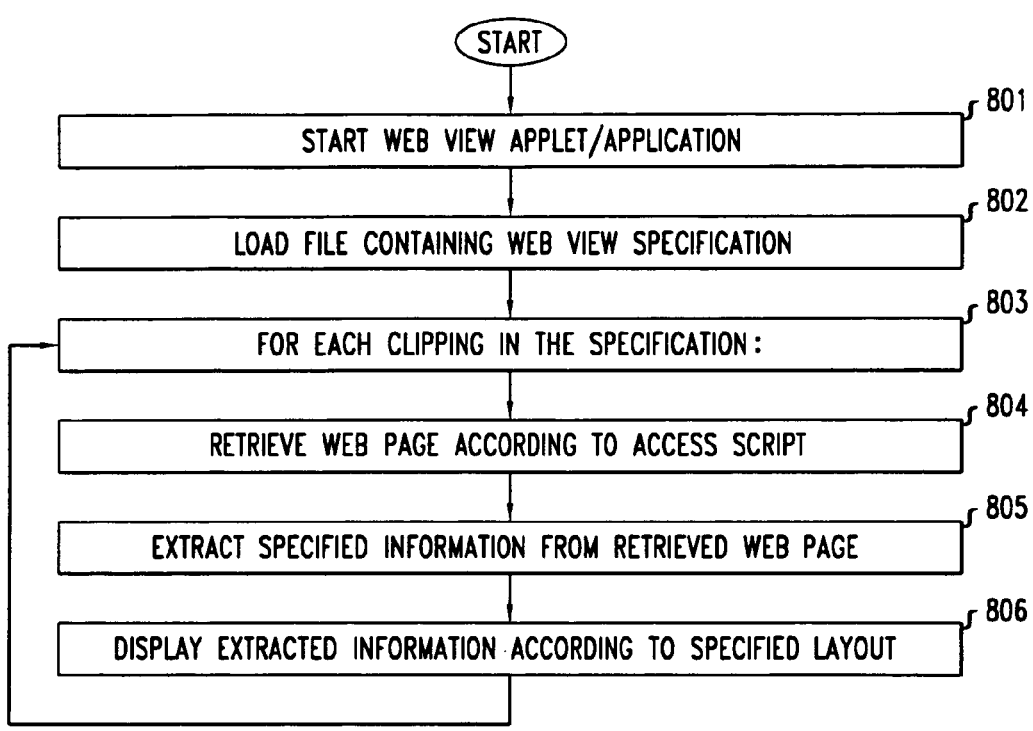
FIG. 8 shows a flowchart detailing the steps for replaying a personal Web view.

With reference to FIG. 8, the steps associated with replaying a personal Web view are illustrated. At step 801, the Web view applet or application are started by the user that may be resident on his machine or on a server. At step 802, the user selects a file that contains the specification of the Web view of interest and loads it into his browser. That file can be local to the user's machine or can be at a remote server. For each clipping in the Web view specification (step 803), the following are steps are performed: at step 804, the access script within the clipping specification retrieves the Web page containing the content of interest; at step 805, the content of interest is extracted from the retrieved Web page according to the extraction expression within the clipping specification; and, at step 806, the extracted content is displayed in the user's browser in the specified frame in accordance with the specified layout for that clipping.

Figure 9:
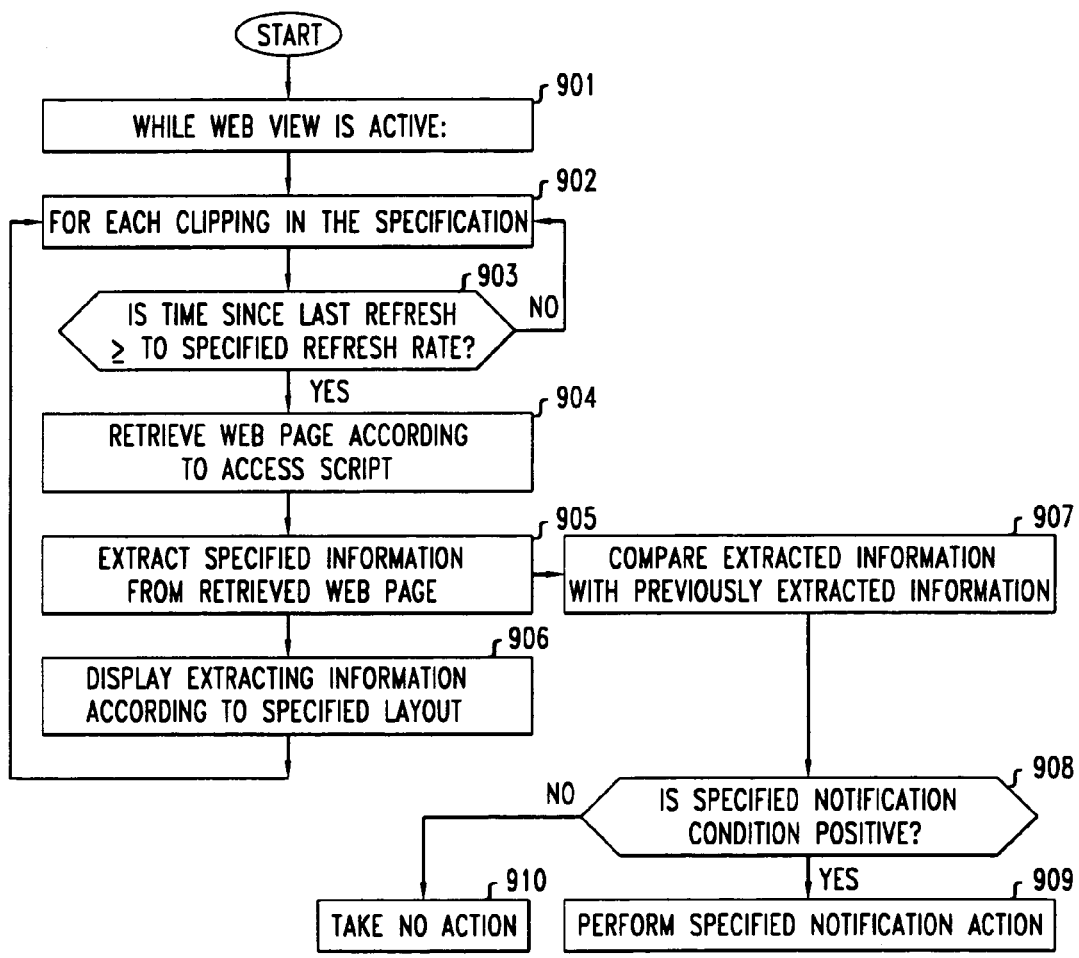
FIG. 9 shows a flowchart detailing the steps for refreshing a personal Web view.

With reference to FIG. 9, the steps associated with refreshing a clipping within the Web view and performing a notification action upon the occurrence of a notification condition are shown. At step 901, while the Web view is active, and at step 902, for each clipping in the specification of the Web view, a determination is made, at step 903, whether the time since that clipping was last refreshed is equal to or greater than the specified refresh rate for that clipping. If not, then the next clipping in the specification is examined. If it is equal to or greater than the specified refresh rate, then, at step 904, the Web page associated with that clipping is retrieved according to the access script. At step 905, the content of interest for that clipping is extracted from the retrieved Web page. At step 906, that refreshed extracted information is then displayed in the Web view according to the specified layout. Steps 903 through 906 are repeated for each of the clippings in the specification continuously so that when the refresh time for any one of the clippings is reached, its associated Web page is retrieved and the information content of interest is extracted and refreshed in the Web view. When after the information content of any clipping as been refreshed at step 905, at step 907, the extracted refreshed information is compared with corresponding previously extracted information. If, at step 908, from that comparison, the specified notification condition associated with that clipping is positive, then, at step 909, the specified notification action is performed. If that specified condition is not positive, then no action takes place (step 910) in response to the refresh of that clipping.

As previously noted, steps described above for replaying a personal Web view can be performed on a user's local machine and the Web view generated displayed on that machine in the user's browser. Alternatively, these same steps could be performed at a network server on which the personalization application is resident. The user would then supply the address of where the specification of the particular Web view he wants displayed and the server will execute that specification and return the final Web view to the requesting client's browser.

The foregoing merely illustrates the principles of the invention. It will thus be appreciated that those skilled in the art will be able to devise various arrangements which, although not explicitly described or shown herein, embody the principles of the invention and are included within its spirit and scope. For example, each Web clipping may include information content from more than source Web page. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views embodying the principles of the invention. Similarly, it will be appreciated that any flow charts, pseudocode, and the like represent various processes which may be substantially represented in computer readable medium and so executed by a computer or processor, whether or not such computer or processor is explicitly shown.

The functions of the various elements shown in the FIGS., may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for Applicant thus regards any means which can provide those functionalities as equivalent as those shown herein.

The invention claimed is:

1. A method of creating a personal Web view comprising:
  creating a plurality of Web clippings, the personal view comprising a plurality of Web clippings, each Web clipping containing information from an associated one of a corresponding plurality of Web pages, each Web page being selected by a user from essentially any accessible Web page on any Web server, each of the plurality of Web clippings being created by:
  generating an access script to automatically retrieve the Web page associated with the Web clipping;
  generating an extraction expression to extract one or more user-selected information elements from the Web page associated with the Web clipping; and
  incorporating the access script and the extraction expression into a specification of the associated Web clipping;
incorporating the specification of each Web clipping into a specification of the Web view; and
storing the specification of the Web view, wherein when the stored specification of the Web view is later replayed and active, the plurality of Web pages are automatically retrieved and the selected one or more information elements from each Web page are extracted and incorporated into each associated Web clipping and the plurality of Web clippings are combined for display in a browser,
wherein the extraction expression generated for at least one Web clipping includes redundancy to insure that when the Web view is later replayed information contained in the at least one Web clipping is information originally selected by the user to be included in the Web view when the Web view was created.

2. The method of claim 1 wherein at least one of the Web pages is directly retrievable through a specified URL which is incorporated into the access script to retrieve that Web page.

3. The method of claim 1 wherein at least one of Web pages is retrievable through a specified site description which is incorporated into the access script to retrieve that Web page.

4. The method of claim 1 wherein at least one of the Web pages is retrievable through a specified a smart bookmark which is incorporated into the access script to retrieve that Web page.

5. The method of claim 1 wherein a layout of the Web clippings within the personal Web view is incorporated in the specification of the Web view.

6. The method of claim 1 wherein the extraction expression generated for one or more of the Web clippings comprises a DOM address of one or more information elements extracted from the retrieved one Web page associated with the one Web clipping.

7. The method of claim 1 wherein the extraction expression generated for one or more of the Web clippings comprises an XPATH expression of one or more information elements extracted from the retrieved one Web page associated with the one Web clipping.

8. The method of claim 1 wherein the redundancy comprises at least one string that is associated with the one or more information elements extracted from the retrieved Web page associated with the at least one Web clipping.

9. The method of claim 1 wherein the specification of at least one Web clipping also incorporates an associated user-specified or default refresh rate so that when the stored specification of the Web view is replayed and active, the Web page associated with the at least one Web clipping that has an associated refresh rate is automatically and independently retrieved at that rate to refresh the information in that Web clipping from that Web page in the Web view.

10. A method of displaying a personal Web view comprising:
  accessing a specification of the personal Web view, the Web view comprising a plurality of Web clippings, each Web clipping containing information from an associated one of a corresponding plurality of Web pages that had previously been individually selected by a user from essentially any accessible Web page on any Web server, the specification of the personal Web view containing a specification for each of the plurality of Web clippings;
  automatically retrieving the Web page associated with each Web clipping in accordance with an access script for retrieving that Web page that is associated with the specification of the Web clipping;
  extracting one or more user-selected information elements from each Web page in accordance with an extraction expression in the specification of each associated Web clipping to create a displayable Web clipping containing those elements, the extraction expression associated with each Web clipping indicating the one or more user-selected information elements from the associated Web page to be included in the Web clipping; and
  combining and displaying in a browser the plurality of Web clippings containing the extracted information elements from the plurality of associated retrieved Web pages,
  wherein the extraction expression in at least one Web clipping includes redundancy to insure that when the at least one Web clipping is displayed in the browser information contained in the at least one Web clipping is information originally selected by the user to be included in the Web view when the Web view was created.

11. The method of claim 10 wherein the access script for at least one of the Web pages directly retrieves the Web page through a specified URL.

12. The method of claim 10 wherein the access script for at least one of the Web pages retrieves the Web page through a specified site description.

13. The method of claim 10 wherein the access script for at least one of the Web pages retrieves the Web page through a specified smart bookmark.

14. The method of claim 10 wherein the Web clippings are displayed in the Web view in the browser in accordance with a layout specified in the specification of the Web view.

15. The method of claim 10 wherein the extraction expression in one or more of the Web clippings comprises a DOM address of one or more user-selected information elements to be extracted from the one Web page associated with the one Web clipping.

16. The method of claim 10 wherein the extraction expression in one or more of the Web clippings comprises an XPATH expression of one or more user-selected information elements to be extracted from the one Web page associated with the one Web clipping.

17. The method of claim 10 wherein the redundancy comprises at least one string that is associated with the one or more information elements extracted from the retrieved Web page associated with the at least one Web clipping.

18. The method of claim 10 wherein the specification of at least one Web clipping also incorporates an associated user-specified or default refresh rate so that when the plurality of Web clippings are combined and displayed in a browser, the Web page associated with the at least one Web clipping that has an associated refresh rate is automatically and independently retrieved at that rate to refresh the information in that at least one Web clipping from that Web page in the Web view.

19. Apparatus for creating a personal Web view comprising:

means for creating each of a plurality of Web clippings, the personal Web view comprising a plurality of Web clippings, each Web clipping containing information from an associated one of a plurality of Web pages, each Web page being selected by a user from essentially any accessible Web page on any Web server, said means for creating comprising:
  means for generating an individual access script to automatically retrieve each Web page associated with each Web clipping;
  means for generating an individual extraction expression to extract one or more user-selected information elements from each Web page associated with each Web clipping; and
  means for incorporating the individual access script and extraction expression for each Web clipping into a specification of the Web clipping;
means for incorporating the specifications of each of the Web clippings into a specification of the Web view; and
means for storing the specification of the Web view, wherein when the stored specification of the Web view is later replayed and active, the plurality of Web pages are automatically retrieved and the user-selected one or more information elements from each Web page are extracted and incorporated into each associated Web clipping and the plurality of Web clippings are combined for display in a browser,
wherein the extraction expression generated for at least one Web clipping includes redundancy to insure that when the Web view is later replayed information contained in the at least one Web clipping is information originally selected by the user to be included in the at Web view when the Web view was created.

20. The apparatus of claim 19 wherein at least one of the Web pages is directly retrievable through a specified URL which is incorporated into the access script to retrieve that Web page.

21. The apparatus of claim 19 wherein at least one of the Web pages is directly retrievable through a specified site description which is incorporated into the access script to retrieve that page.

22. The apparatus of claim 19 wherein at least one of the Web pages is directly retrievable through a specified smart bookmark which is incorporated into the script to retrieve that page.

23. The apparatus of claim 19 wherein a layout of the plurality of Web clippings within the personal Web view is incorporated in the specification of the Web view.

24. The apparatus of claim 19 wherein the extraction expression in one or more of the Web clippings comprises a DOM address of one or more user-selected information elements extracted from the one Web page associated with the one Web clipping.

25. The apparatus of claim 19 wherein the extraction expression in one or more of the Web clippings comprises an XPATH expression of one or more user-selected information elements extracted from the one Web page associated with the one Web clipping.

26. The apparatus of claim 19 wherein the redundancy comprises at least one string that is associated with the one or more information elements extracted from the retrieved Web page associated with the at least one Web clipping.

27. The apparatus of claim 19 wherein the specification of at least one Web clipping also incorporates an associated user-specified or default refresh rate so that when the stored specification of the Web view is replayed and active, the Web page associated with the at least one Web clipping that has an associated refresh rate is automatically and independently retrieved at that rate to refresh the information in that Web clipping from that Web page in the Web view.

28. Apparatus for displaying a personal Web view comprising a plurality of Web clippings, each Web clipping containing information from an associated one of a plurality of Web pages, the apparatus comprising:
  means for accessing a specification of the personal Web view, the Web view comprising a plurality of Web clippings, each Web clipping containing information from an associated one of a corresponding plurality of Web pages that had previously been individually selected by a user from essentially any accessible Web page on any Web server, the specification of the personal view containing a specification for each of the plurality of Web clippings;
  means for automatically retrieving the Web page associated with each Web clipping in accordance with an access script for retrieving that Web page that is associated with the specification of the Web clipping;
  means for extracting one or more user-selected information elements in each Web page in accordance with an extraction expression in the specification of each associated Web clipping to create a displayable Web clipping containing those elements; and
  means for combining and displaying in a browser the plurality of Web clippings containing the extracted information elements from the plurality of associated retrieved Web pages,
wherein the extraction expression in at least one Web clipping includes redundancy to insure that when the at least one Web clipping is displayed in the browser information contained in the at least one Web clipping is information originally selected by the user to be included the Web view when the Web view was created.

29. The apparatus of claim 28 wherein the access script for at least one of the Web pages directly retrieves the Web page through a specified URL.

30. The apparatus of claim 28 wherein the access script for at least one of the Web pages retrieves the Web page through a specified site description.

31. The apparatus of claim 28 wherein the access script for at least one of the Web pages retrieves the Web page through a specified smart bookmark.

32. The apparatus of claim 28 wherein the plurality of Web clippings are displayed in the Web view in the browser in accordance with a layout specified in the specification of the Web view.

33. The apparatus of claim 28 wherein the extraction expression in one or more of the Web clippings comprises a DOM address of one or more user-selected information elements extracted from the one Web page associated with the one Web clipping.

34. The apparatus of claim 28 wherein the extraction expression in one or more of the Web clippings comprises an XPATH expression of one or more user-selected information elements extracted from the one Web page associated with the one Web clipping.

35. The apparatus of claim 28 wherein the redundancy comprises at least one string that is associated with the one or more information elements to be extracted from the retrieved Web page associated with the at least one Web clipping.

36. The apparatus of claim 28 wherein the specification of at least one Web clipping also incorporates an associated user-specified or default refresh rate so that when the plurality of Web clippings are combined and displayed in a browser, the Web page associated with the at least one Web clipping that has an associated refresh rate is automatically and independently retrieved at that rate to refresh the information in that at least one Web clipping from that Web page in the Web view.

37. A computer readable media tangibly embodying a program of instructions executable by a computer to perform a method for creating a personal Web view, the method comprising:

creating a plurality of Web clippings, the personal view comprising a plurality of Web clippings, each Web clipping containing information from an associated one of a corresponding plurality of Web pages, each Web page being selected by a user from essentially any accessible Web page on any Web server, each of the plurality of Web clippings being created by:

generating an access script to automatically retrieve the Web page associated with the Web clipping;

generating an extraction expression to extract one or more user-selected information elements from the Web page associated with the Web clipping; and incorporating the access script and the extraction expression into a specification of the associated Web clipping;

incorporating the specification of each Web clipping into a specification of the Web view; and storing the specification of the Web view, wherein when the stored specification of the Web view is later replayed and active, the plurality of Web pages are automatically retrieved and the selected one or more information elements from each Web page are extracted and incorporated into each associated Web clipping and the plurality of Web clippings are combined for display in a browser, wherein in the method the extraction expression generated for at least one Web clipping includes redundancy to insure that when the Web view is later replayed information contained in the at least one Web clipping is information originally selected by the user to be included in the Web view when the Web view was created.

38. The media of claim 37 wherein in the method at least one of the Web pages is directly retrievable through a specified URL which is incorporated into the access script to retrieve that Web page.

39. The media of claim 37 wherein in the method at least one of specified Web pages is retrievable through a specified site description which is incorporated into the access script to retrieve that Web page.

40. The media of claim 37 wherein in the method at least one of the Web pages is retrievable through a specified a smart bookmark which is incorporated into the access script to access that Web page.

41. The media of claim 37 wherein in the method a layout of the plurality of Web clippings within the personal Web view is incorporated in the specification of the Web view.

42. The media of claim 37 wherein in the method the extraction expression generated for one or more of the Web clippings comprises a DOM address of one or more information elements extracted from the retrieved one Web page associated with the one Web clipping.

43. The media of claim 37 wherein in the method the extraction expression generated for one or more of the Web clippings comprises an XPATH expression of one or more information elements extracted from the retrieved one Web page associated with the one Web clipping.

44. The media of claim 37 wherein in the method the redundancy comprises at least one string that is associated with one or more information elements extracted from the retrieved Web page associated with the at least one Web clipping.

45. The media of claim 37 wherein in the method the specification of at least one Web clipping also incorporates an associated user-specified or default refresh rate so that when the stored specification of the Web view is replayed and active, the Web page associated with the at least one Web clipping that has an associated refresh rate is automatically and independently retrieved at that rate to refresh the information in that Web clipping from that Web page in the Web view.

46. A computer readable media tangibly embodying a program of instructions executable by a computer to perform a method for displaying a personal Web view, the method comprising:

accessing a specification of the personal Web view, the Web view comprising a plurality of Web clippings, each Web clipping containing information from an associated one of a corresponding plurality of Web pages that had previously been individually selected by a user from essentially any accessible Web page on any Web server, the specification of the personal Web view containing a specification for each of the plurality of Web clippings;

automatically retrieving the Web page associated with each Web clipping in accordance with an access script for retrieving that Web page that is associated with the specification of the Web clipping;

extracting one or more user-selected information elements from each Web page in accordance with an extraction expression in the specification of each associated Web clipping to create a displayable Web clipping containing those elements, the extraction expression associated with each Web clipping indicating the one or more user-selected information elements on the associated Web page to be included in the Web clipping; and combining and displaying in a browser the plurality of Web clippings containing the extracted information elements from the plurality of associated retrieved Web pages, wherein the extraction expression in at least one Web clipping includes redundancy to insure that when the at least one Web clipping is displayed in the browser information contained in the at least one Web clipping is information originally selected by the user to be in the Web view when the Web view was created.

47. The media of claim 46 wherein in the method the access script for at least one of the Web pages directly retrieves the Web page through a specified URL.

48. The media of claim 46 wherein in the method the access script for at least one of the Web pages directly retrieves the Web page through a specified site description.

49. The media of claim 46 wherein in the method the access script for at least one of the Web pages directly retrieves the Web page through a specified smart bookmark.

50. The media of claim 46 wherein in the method the information in the plurality of Web clippings is displayed in the browser in accordance with a layout specified in the specification of the Web view.

51. The media of claim 46 wherein in the method the extraction expression in one or more of the Web clippings comprises a DOM address of one or more user-selected information elements extracted from the one Web page associated with the one Web clipping.

52. The media of claim 46 wherein in the method the extraction expression in one or more of the Web clippings comprises an XPATH expression of one or more user-selected information elements extracted from the one Web page associated with the one Web clipping.

53. The media of claim 46 wherein in the method the redundancy comprises at least one string that is associated with the one or more information elements to be extracted from the retrieved Web page associated with the at least one Web clipping.

54. The media of claim 46 wherein in the method the specification of at least one Web clipping also incorporates an associated user-specified or default refresh rate so that when the plurality of Web clippings are combined and displayed in a browser, the Web page associated with the at least one Web clipping that has an associated refresh rate is automatically and independently retrieved at that rate to refresh the information in that at least one Web clipping from that Web page in the Web view.

* * * * *